(12) United States Patent
Kalyanaraman et al.

(10) Patent No.: US 9,172,587 B2
(45) Date of Patent: *Oct. 27, 2015

(54) PROVIDING AUTOMATED QUALITY-OF-SERVICE ('QOS') FOR VIRTUAL MACHINE MIGRATION ACROSS A SHARED DATA CENTER NETWORK

(71) Applicant: INTERNATIONAL BUSINESS MACHINES CORPORATION, Armonk, NY (US)

(72) Inventors: Shivkumar Kalyanaraman, Bangalore (IN); Vijay Mann, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 433 days.

This patent is subject to a terminal disclaimer.

(21) Appl. No.: 13/657,041

(22) Filed: Oct. 22, 2012

(65) Prior Publication Data
US 2014/0115162 A1 Apr. 24, 2014

(51) Int. Cl.
G06F 15/173 (2006.01)
H04L 29/08 (2006.01)
H04L 12/24 (2006.01)
H04L 12/801 (2013.01)
H04L 29/06 (2006.01)

(52) U.S. Cl.
CPC ....... *H04L 29/08954* (2013.01); *H04L 41/0896* (2013.01); *H04L 47/10* (2013.01); *H04L 65/80* (2013.01)

(58) Field of Classification Search
None
See application file for complete search history.

(56) References Cited

U.S. PATENT DOCUMENTS

| 7,990,978 | B1 * | 8/2011 | Chamas et al. | .......... 370/395.21 |
| 8,027,354 | B1 | 9/2011 | Portolani et al. | |
| 2006/0005189 | A1 | 1/2006 | Vega et al. | |

(Continued)

FOREIGN PATENT DOCUMENTS

| CN | 102185928 A | 9/2011 |
| CN | 102609361 A | 7/2012 |

OTHER PUBLICATIONS

Liu et al. "Live Migration of Virtual Machine Based on Full System Trace and Replay" Service computing teachnology and system lab publication date 2009.*
Liu et al. "Live Migration of Virtual Machine Based on Full System Trace and Replay" Publication date 2009.*

(Continued)

*Primary Examiner* — Joshua Joo
*Assistant Examiner* — Younes Naji
(74) *Attorney, Agent, or Firm* — Edward J. Lenart; James R. Nock; Kennedy Lenart Spraggins LLP

(57) ABSTRACT

Providing automated quality-of-service ('QoS') for virtual machine migration across a shared data center network, including: identifying, by a virtual machine migration module, a virtual machine to migrate from a source host to a destination host; determining a migration cost for migrating the virtual machine from the source host to the destination host; identifying based on the migration cost a least congested network path between the source host and the destination host and a bandwidth to be used for migration such that migration completes within a user specified time limit; and initiating transmission of the virtual machine from the source host to the destination host over the least congested network path, including reserving bandwidth across the shared data center network for transferring the virtual machine from the source host to the destination host in dependence upon the migration cost.

8 Claims, 4 Drawing Sheets

(56) References Cited

U.S. PATENT DOCUMENTS

| | | | |
|---|---|---|---|
| 2009/0323706 A1 | 12/2009 | Germain et al. | |
| 2010/0027420 A1* | 2/2010 | Smith | 370/235 |
| 2010/0287548 A1 | 11/2010 | Zhou et al. | |
| 2011/0131576 A1 | 6/2011 | Ikegaya et al. | |
| 2011/0138384 A1 | 6/2011 | Bozek et al. | |
| 2011/0246669 A1 | 10/2011 | Kanada et al. | |
| 2011/0289205 A1 | 11/2011 | Hansson et al. | |
| 2011/0307886 A1 | 12/2011 | Thanga et al. | |
| 2012/0219014 A1* | 8/2012 | Glaeser | 370/468 |
| 2013/0138764 A1* | 5/2013 | Satapathy | 709/214 |

OTHER PUBLICATIONS

Clark, C., et al., "Live Migration of Virtual Machines", Proceedings of the 2nd ACM/USENIX Symposium on Networked Systems Design and Implementation (NSDI'05), May 2005, pp. 273-286, vol. 2, ACM, USA.

PCT Search Report and Written Opinion, PCT/CN2013/085579, Jan. 23, 2014, pp. 1-10.

Mann et al., "VMPatrol: Dynamic and Automated Qos for Virtual Machine Migrations", Proceedings of the 8th International Conference on Network and Service Management (CNSM '12), Oct. 2012, pp. 174-178, International Federation for Information Processing Laxenburg, Austria.

* cited by examiner

PROVIDING AUTOMATED QUALITY-OF-SERVICE ('QOS') FOR VIRTUAL MACHINE MIGRATION ACROSS A SHARED DATA CENTER NETWORK

BACKGROUND OF THE INVENTION

1. Field of the Invention

The field of the invention is data processing, or, more specifically, methods, apparatus, and products for providing automated quality-of-service ('QoS') for virtual machine migration across a shared data center network.

2. Description of Related Art

Modern data centers can include many virtual machines that execute on physical machines. Migrating a particular virtual machine from one physical machine to another physical machine, however, are considered expensive operations because of the additional network traffic that is generated, which can impact the network performance of other applications in the data center. Furthermore, such operations are also expensive because of the downtime that applications running on the virtual machine may experience.

SUMMARY OF THE INVENTION

Methods, apparatus, and products for providing automated quality-of-service ('QoS') for virtual machine migration across a shared data center network, including: identifying, by a virtual machine migration module, a virtual machine to migrate from a source host to a destination host; determining, by the virtual machine migration module, a migration cost for migrating the virtual machine from the source host to the destination host; identifying based on the migration cost, by the virtual machine migration module, a least congested network path between the source host and the destination host and a bandwidth to be used for migration such that migration completes within a user specified time limit; and initiating, by the virtual machine migration module, transmission of the virtual machine from the source host to the destination host over the least congested network path, including reserving bandwidth across the shared data center network for transferring the virtual machine from the source host to the destination host in dependence upon the migration cost.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
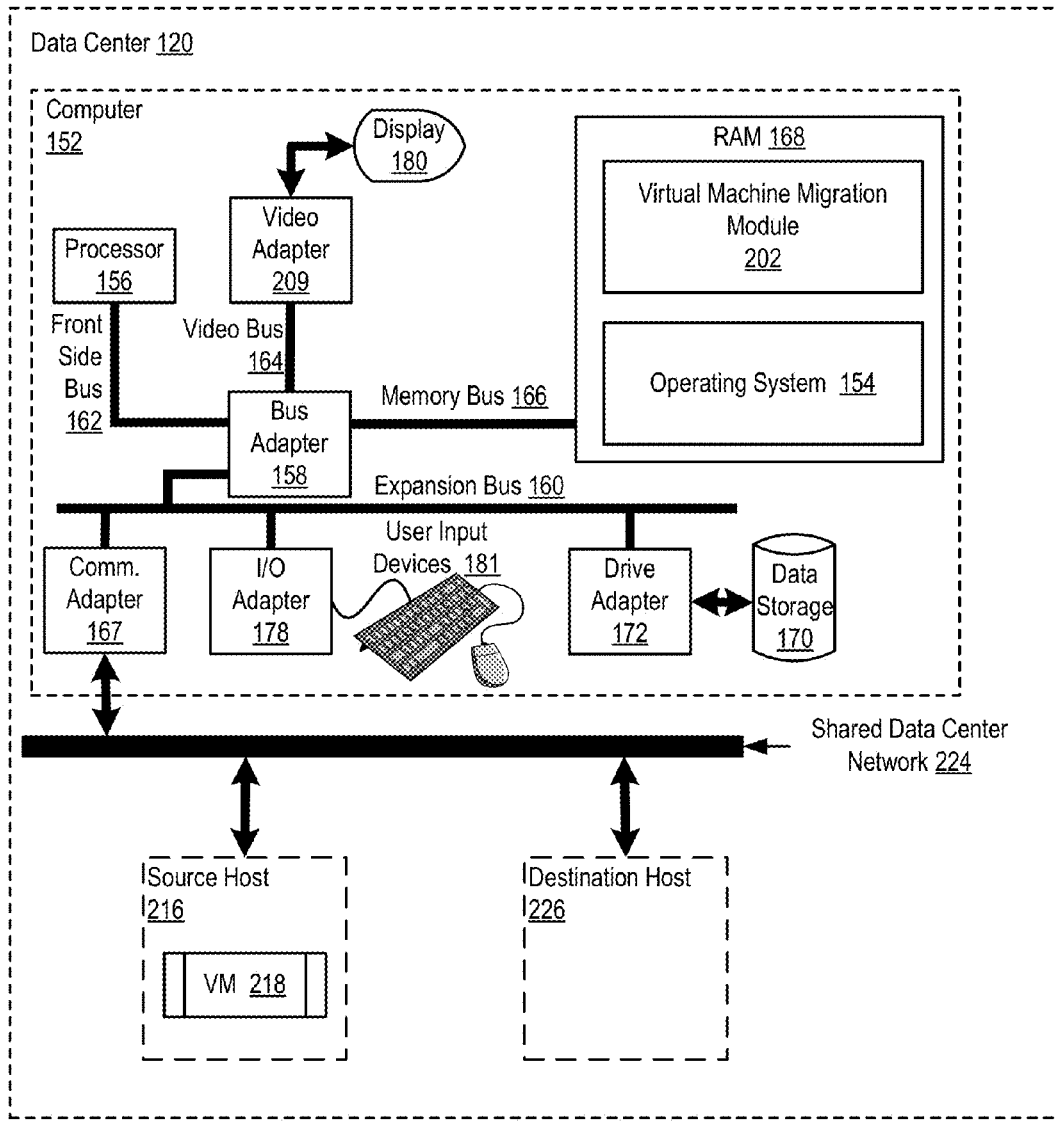
FIG. 1 sets forth a block diagram of automated computing machinery comprising an example computer useful in providing automated QoS for virtual machine migration across a shared data center network according to embodiments of the present invention.

Example methods, apparatus, and products for providing automated quality-of-service ('QoS') for virtual machine migration across a shared data center network in accordance with the present invention are described with reference to the accompanying drawings, beginning with FIG. 1. FIG. 1 sets forth a block diagram of automated computing machinery comprising an example computer (152) useful in providing automated QoS for virtual machine (218) migration across a shared data center network (224) according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a virtual machine migration module (202), a module of computer program instructions improved for providing automated QoS for virtual machine (218) migration across a shared data center network (224) according to embodiments of the present invention. Each virtual machine (218) is a software implementation of a physical machine such as a stand-alone computer, blade server, and so on. Each virtual machine (218) runs on a physical machine, and as such, the underlying resources of the physical machine may be shared between different virtual machines, each of which may run its own operating system. The software layer providing the virtualization is called a virtual machine monitor or hypervisor. A hypervisor is a module of automated computing machinery that performs software and hardware platform-virtualization in order to enable multiple operating systems to run on a host computer concurrently in separate virtual machines. A hypervisor runs directly on the host's hardware to control hardware access and to monitor guest operating-systems. A guest operating system runs on a level above the hypervisor. The platform virtualization provided by a hypervisor is referred to in this specification as a virtualized environment. A virtualized environment is one in which physical characteristics of a computing platform—computer processors, computer memory, I/O adapters, and the like—are abstracted from the perspective of an operating system and other software applications.

The virtual machine (218) may be migrated from a source host (216) to a destination host (226). Each host (216, 226) is a physical machine capable of supporting the virtual machine (218). In such an example, migrating the virtual machine (218) from the source host (216) to the destination host (226) causes the virtual machine (218), which was originally running on the source host (216), to begin running on the destination host (226) and to cease operation on the source host (216). The virtual machine (218) may be migrated from the source host (216) to the destination host (226) via a shared data center network (224). The shared data center network (224) can be embodied, for example, as a data communications network that with multiple switches that connect one or more physical devices, such as the source host (216) and the destination host (226), in a data center (120).

The virtual machine migration module (202) can carry out providing automated QoS for virtual machine (218) migration across a shared data center network (224) by identifying a virtual machine (218) to migrate from a source host (216) to a destination host (226). Identifying a virtual machine (218)

to migrate from a source host (216) to a destination host (226) may be carried out, for example, through the use of load balancing algorithms that identify inefficiencies in the utilization of physical resources. Such loading balancing algorithms may identify, for example, that virtual machines executing on a first host are utilizing all the physical resources of the first host that are made available to the virtual machines, while the virtual machines executing on a second host are only using a small portion of the physical resources of the second host that are made available to the virtual machines. In such an example, one or more virtual machines may be migrated from the first host to the second host to better utilize the total physical resources of machines in the data center. A virtual machine may also be migrated from a host for maintenance, for example, if the source host is being switched off for hardware replacement or upgrade.

The virtual machine migration module (202) can further carry out providing automated QoS for virtual machine (218) migration across a shared data center network (224) by determining a migration cost for migrating the virtual machine (218) from the source host (216) to the destination host (226). The migration cost for migrating the virtual machine (218) from the source host (216) to the destination host (226) represents the amount of system resources that will be required to migrate the virtual machine (218), the decrease in system performance that will be required to migrate the virtual machine (218), and so on. Determining the migration cost (208) for migrating the virtual machine (218) from the source host (216) to the destination host (226) may include, for example, determining the amount of network bandwidth required to migrate the virtual machine (218) from the source host (216) to the destination host (226) such that migration does not timeout and finishes within a given deadline, determining the amount of time that the virtual machine (218) will be unavailable as it is being migrated from the source host (216) to the destination host (226), and so on.

The virtual machine migration module (202) can further carry out providing automated QoS for virtual machine (218) migration across a shared data center network (224) by identifying, based on the migration cost, a least congested network path between the source host (216) and the destination host (226). A network path between the source host (216) and the destination host (226) may be embodied as a data communications connected between the source host (216) and the destination host (226). The data communications path may include all intervening network equipment located between the source host (216) and the destination host (226). The source host (216) and the destination host (226) are configured for data communications between the source host (216) and the destination host (226) via the network path.

Consider an example in which a first set of network switches, identified as switch A and switch B, in the shared data center network (224) couple the source host (216) and the destination host (226) for data communications. Also assume that a second set of switches, identified as switch C and switch D, in the shared data center network (224) also couple the source host (216) and the destination host (226) for data communications. In such an example, a first network path may be identified as the data communications path that includes the source host (216), switch A, switch B, and the destination host (226). Likewise, a second network path may be identified as the data communications path that includes the source host (216), switch C, switch D, and the destination host (226). Identifying a least congested network path between the source host (216) and the destination host (226) may be carried out, for example, by identifying the network path that has the highest amount of available bandwidth for transmitting data between the source host (216) and the destination host (226).

The virtual machine migration module (202) can further carry out providing automated QoS for virtual machine (218) migration across a shared data center network (224) by initiating transmission of the virtual machine (218) from the source host (216) to the destination host (226) over the least congested network path. Transmission of the virtual machine (218) from the source host (216) to the destination host (226) over the least congested network path may be carried out, for example, by copying the contents of physical memory on the source host (216) that is available for use by the virtual machine (218), copying the operating system utilized by the virtual machine (218), copying software applications executed by the virtual machine (218), copying all state information related to the virtual machine (218), and so on. Such information may be includes in one or more data communications messages that are transmitted over the least congested network path between the source host (216) to the destination host (226). Initiating transmission of the virtual machine (218) from the source host (216) to the destination host (226) over the least congested network path may be carried out by the virtual machine migration module (202) performing the operations described above, or alternatively, by the virtual machine migration module (202) making one or more calls to computer program instructions that carry out such operations.

Also stored in RAM (168) is an operating system (154). Operating systems useful providing automated QoS for virtual machine migration across a shared data center network according to embodiments of the present invention include UNIX™, Linux™, Microsoft XP™, AIX™, IBM's i5/OS™, and others as will occur to those of skill in the art. The operating system (154) and virtual machine migration module (202) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for providing automated QoS for virtual machine migration across a shared data center network according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers and for data communications with a data communications network such as the shared data center network (224). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for providing automated QoS for virtual machine migration across a shared data center network according to embodiments of the present invention include modems for wired dial-up communications, Ethernet (IEEE 802.3) adapters for wired data communications network communications, and 802.11 adapters for wireless data communications network communications.

Figure 2:
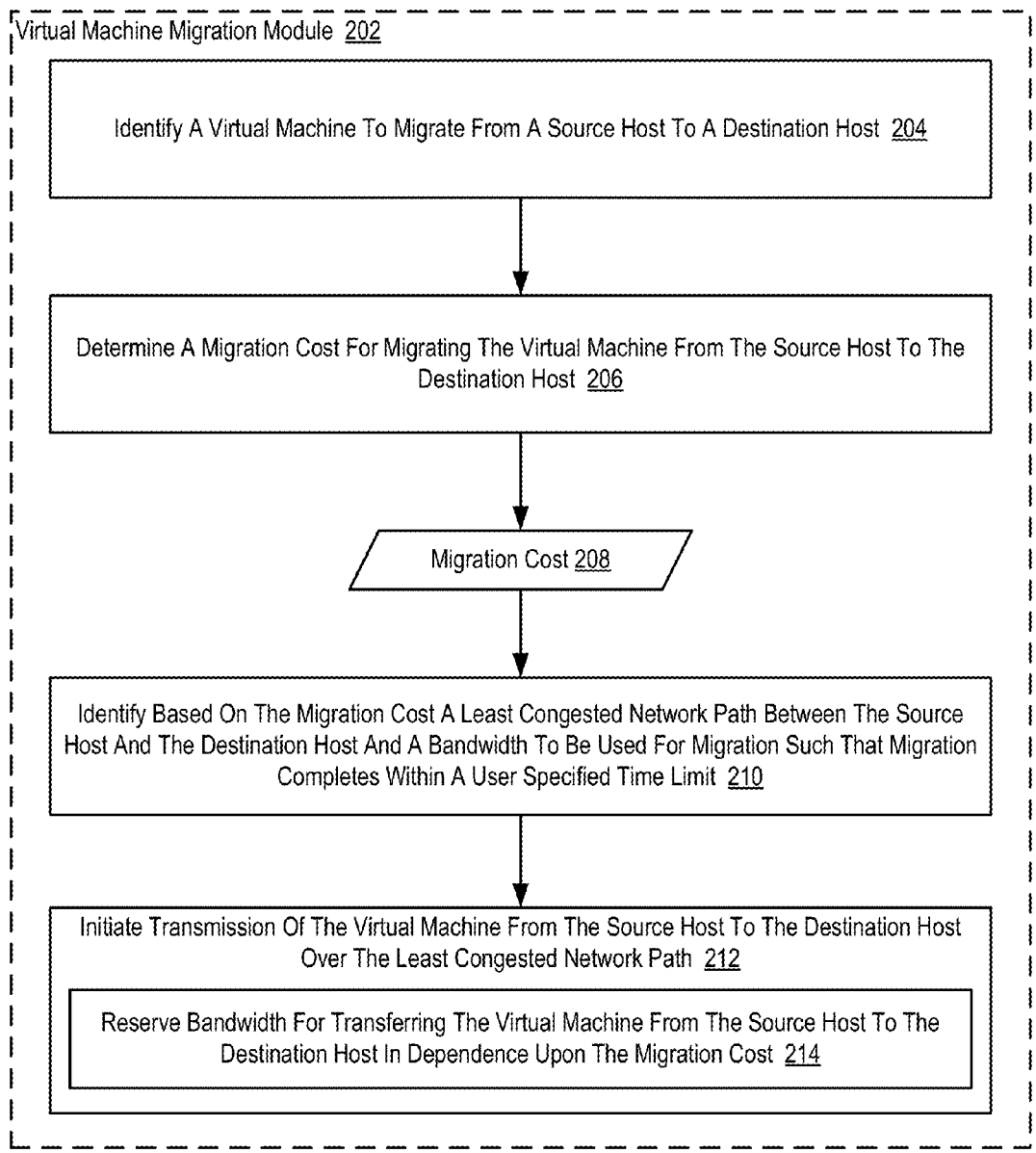
FIG. 2 sets forth a flow chart illustrating an example method for providing automated QoS for virtual machine migration across a shared data center network according to embodiments of the present invention.
Figure 2:
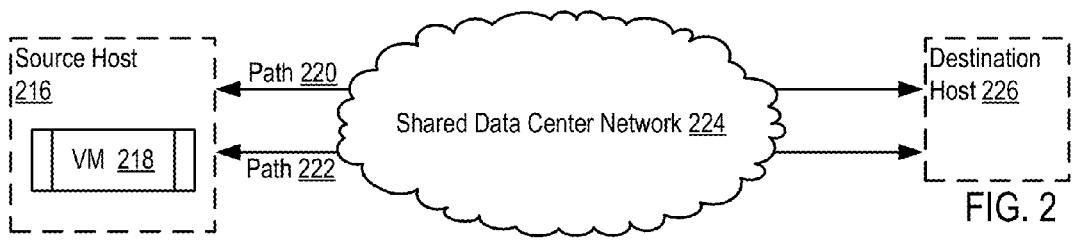

For further explanation, FIG. 2 sets forth a flow chart illustrating an example method for providing automated QoS for virtual machine (218) migration across a shared data center network (224) according to embodiments of the present invention. In the example method of FIG. 2, each virtual machine (218) is a software implementation of a physical machine such as a stand-alone computer, blade server, and so on. Each virtual machine (218) runs on a physical machine, and as such, the underlying resources of the physical machine may be shared between different virtual machines, each of which may run its own operating system. The software layer providing the virtualization is called a virtual machine monitor or hypervisor. A hypervisor is a module of automated computing machinery that performs software and hardware platform-virtualization in order to enable multiple operating systems to run on a host computer concurrently in separate virtual machines. A hypervisor runs directly on the host's hardware to control hardware access and to monitor guest operating-systems. A guest operating system runs on a level above the hypervisor. The platform virtualization provided by a hypervisor is referred to in this specification as a virtualized environment. A virtualized environment is one in which physical characteristics of a computing platform—computer processors, computer memory, I/O adapters, and the like—are abstracted from the perspective of an operating system and other software applications.

In the example method of FIG. 2, the virtual machine (218) may be migrated from a source host (216) to a destination host (226). Each host (216, 226) is a physical machine capable of supporting the virtual machine (218). In such an example, migrating the virtual machine (218) from the source host (216) to the destination host (226) causes the virtual machine (218), which was originally running on the source host (216), to begin running on the destination host (226) and to cease operation on the source host (216). The virtual machine (218) may be migrated from the source host (216) to the destination host (226) via a shared data center network (224). The shared data center network (224) can be embodied, for example, as a data communications network that connects one or more physical devices, such as the source host (216) and the destination host (226), in a data center.

The example method of FIG. 2 includes identifying (204), by a virtual machine migration module (202), a virtual machine (218) to migrate from a source host (216) to a destination host (226). In the example method of FIG. 2, the virtual machine migration module (202) is a module of computer program instructions configured to monitor virtual machines executing on hosts in a data center and migrate the virtual machines between hosts in the data center to improve performance of the virtual machines, improved the utilization of physical resources in the data center, and so on.

In the example method of FIG. 2, identifying (204) a virtual machine (218) to migrate from a source host (216) to a destination host (226) may be carried out, for example, through the use of load balancing algorithms that identify inefficiencies in the utilization of physical resources. Such loading balancing algorithms may identify, for example, that virtual machines executing on a first host are utilizing all the physical resources of the first host that are made available to the virtual machines, while the virtual machines executing on a second host are only using a small portion of the physical resources of the second host that are made available to the virtual machines. In such an example, one or more virtual machines may be migrated from the first host to the second host to better utilize the total physical resources of machines in the data center. A virtual machine may also be migrated from a host for maintenance, for example, if the source host is being switched off for hardware replacement or upgrade.

The example method of FIG. 2 also includes determining (206), by the virtual machine migration module (202), a migration cost (208) for migrating the virtual machine (218) from the source host (216) to the destination host (226). The migration cost (208) for migrating the virtual machine (218) from the source host (216) to the destination host (226) represents the amount of system resources that will be required to migrate the virtual machine (218), the decrease in system performance that will be required to migrate the virtual machine (218), and so on. In the example method of FIG. 2, determining (206) the migration cost (208) for migrating the virtual machine (218) from the source host (216) to the destination host (226) may include, for example, determining the amount of network bandwidth required to migrate the virtual machine (218) from the source host (216) to the destination host (226) so that migration does not time out and finishes before a given deadline, determining the amount of time that the virtual machine (218) will be unavailable as it is being migrated from the source host (216) to the destination host (226), and so on.

The example method of FIG. 2 also includes identifying (210) based on the migration cost (208), by the virtual machine migration module (202), a least congested network path between the source host (216) and the destination host (226) and a bandwidth to be used for migration such that migration completes within a user specified time limit. In the example of FIG. 2, a network path between the source host (216) and the destination host (226) may be embodied as a data communications connected between the source host (216) and the destination host (226). The data communications path may include all intervening network equipment located between the source host (216) and the destination host (226). In the example method of FIG. 2, the source host (216) and the destination host (226) are configured for data communications between the source host (216) and the destination host (226) via the network path.

Consider an example in which a first set of network switches, identified as switch A and switch B, in the shared data center network (224) couple the source host (216) and the destination host (226) for data communications. Also assume that a second set of switches, identified as switch C and switch D, in the shared data center network (224) also couple the source host (216) and the destination host (226) for data communications. In such an example, a first network path may be identified as the data communications path that includes the source host (216), switch A, switch B, and the destination host (226). Likewise, a second network path may be identified as the data communications path that includes the source host (216), switch C, switch D, and the destination host (226). In the example method of FIG. 2, identifying (210) a least congested network path between the source host (216) and the destination host (226) may be carried out, for example, by identifying the network path that has the highest amount of available bandwidth for transmitting data between the source host (216) and the destination host (226).

The example method of FIG. 2 also includes initiating (212), by the virtual machine migration module (202), transmission of the virtual machine (218) from the source host (216) to the destination host (226) over the least congested network path. In the example method of FIG. 2, transmission of the virtual machine (218) from the source host (216) to the destination host (226) over the least congested network path may be carried out, for example, by copying the contents of physical memory on the source host (216) that is available for use by the virtual machine (218), copying the operating system utilized by the virtual machine (218), copying software applications executed by the virtual machine (218), copying all state information related to the virtual machine (218), and so on. Such information may be includes in one or more data communications messages that are transmitted over the least congested network path between the source host (216) to the destination host (226). In the example method of FIG. 2, initiating (212) transmission of the virtual machine (218) from the source host (216) to the destination host (226) over the least congested network path may be carried out by the virtual machine migration module (202) performing the operations described above, or alternatively, by the virtual machine migration module (202) making one or more calls to computer program instructions that carry out such operations.

In the example method of FIG. 2, initiating (212) transmission of the virtual machine (218) from the source host (216) to the destination host (226) over the least congested network path includes reserving (214) bandwidth across the shared data center network (224) for transferring the virtual machine (218) from the source host (216) to the destination host (226) in dependence upon the migration cost (208). In the example method of FIG. 2, the migration bandwidth represents the amount of data that is transmitted from the source host (216) to the destination host (226) per unit of time. Such bandwidth may be specified, for example, in terms of MB per second. In the example method of FIG. 2, the bandwidth for transmitting the virtual machine (218) from the source host (216) to the destination host (226) may be set (214) in dependence upon the migration cost (208) such that predetermined transmission requirements may be met.

Figure 3:
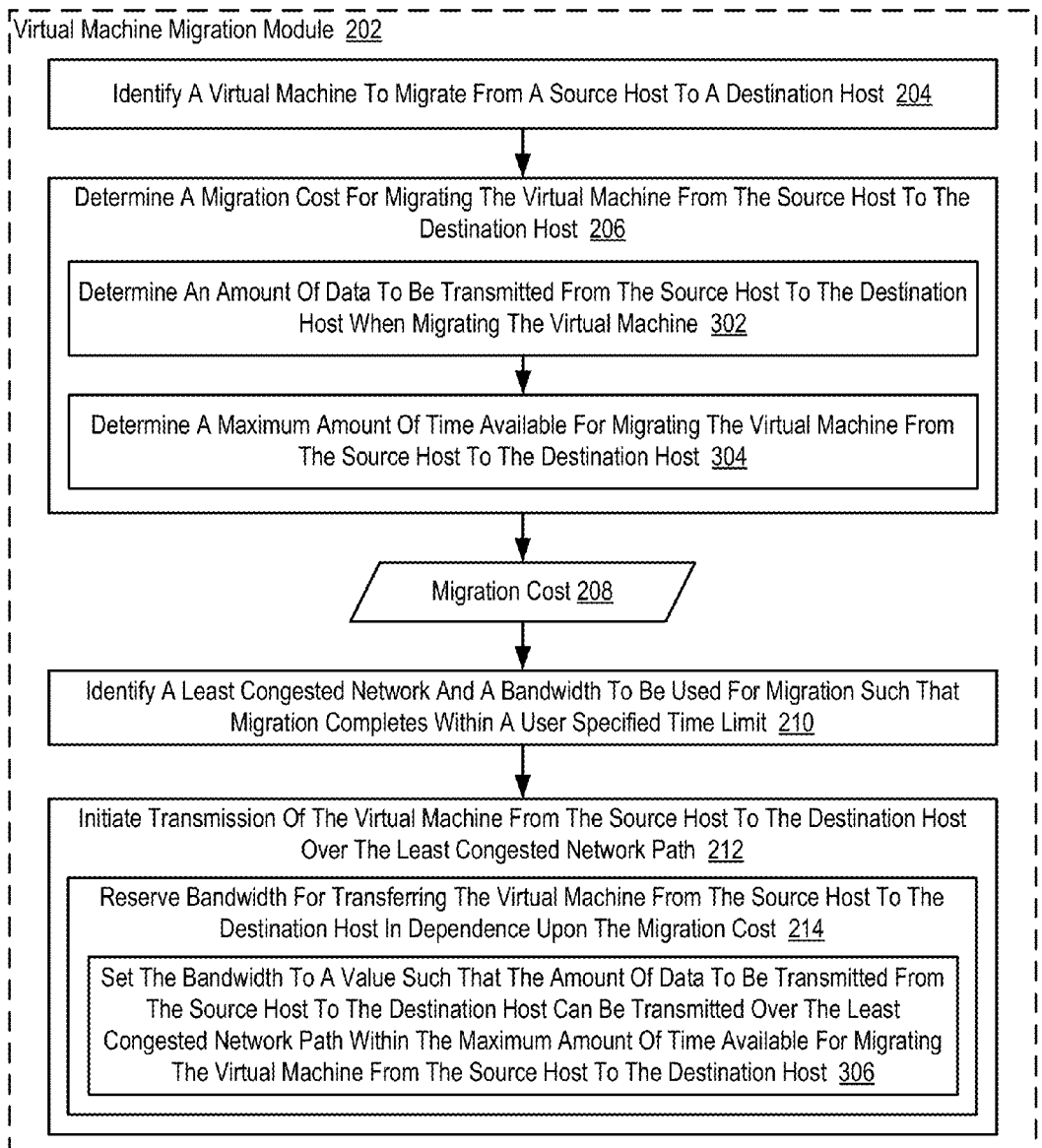
FIG. 3 sets forth a flow chart illustrating an example method for providing automated QoS for virtual machine migration across a shared data center network according to embodiments of the present invention.
Figure 3:
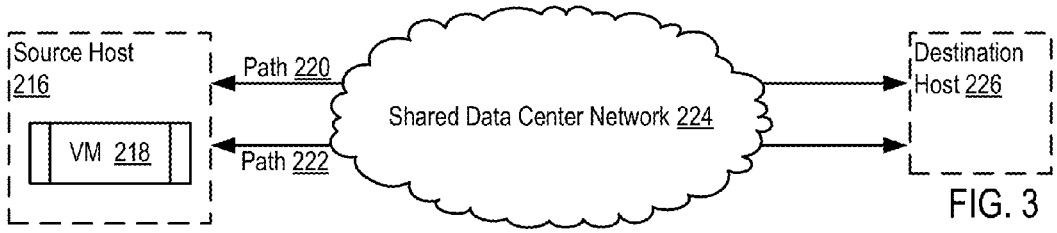

For further explanation, FIG. 3 sets forth a flow chart illustrating a further example method for providing automated QoS for virtual machine (218) migration across a shared data center network (224) according to embodiments of the present invention. The example method of FIG. 3 is similar to the example method of FIG. 2 as it also includes identifying (204) a virtual machine (218) to migrate from a source host (216) to a destination host (226), determining (206) a migration cost (208) for migrating the virtual machine (218) from the source host (216) to the destination host (226), identifying (210) based on the migration cost (208) a least congested network path between the source host (216) and the destination host (226), initiating (212) transmission of the virtual machine (218) from the source host (216) to the destination host (226) over the least congested network path, and reserving (214) bandwidth for transferring the virtual machine (218) from the source host (216) to the destination host (226) in dependence upon the migration cost (208).

In the example method of FIG. 3, determining (206), by the virtual machine migration module (202), a migration cost (208) for migrating the virtual machine (218) from the source host (216) to the destination host (226) includes determining (302) an amount of data to be transmitted from the source host (216) to the destination host (226) when migrating the virtual machine (218) from the source host (216) to the destination host (226). Each virtual machine (218) executing on a particular host has access to some amount of physical memory on the host that is allocated for exclusive use by virtual machine (218). In such a way, the virtual machine (218) may use this memory provided by the host as its own memory. Migrating the virtual machine (218) from the source host (216) to the destination host (226) therefore requires that the contents of the physical memory on the source host (216) that is allocated for exclusive use by virtual machine (218) are transferred from the source host (216) to the destination host (226).

The rate at which pages within the physical memory on the source host (216) that is allocated for exclusive use by virtual machine (218) are 'dirtied' may also impact the amount of data that is to be transmitted from the source host (216) to the destination host (226) when migrating the virtual machine (218) from the source host (216) to the destination host (226). Determining (302) an amount of data to be transmitted from the source host (216) to the destination host (226) when migrating the virtual machine (218) from the source host (216) to the destination host (226) may therefore include determining the size of the physical memory on the source host (216) that is allocated for exclusive use by virtual machine (218), determining the amount of time that will be required to transfer the contents of the physical memory on the source host (216) that is allocated for exclusive use by virtual machine (218), and determining the rate at which pages are dirtied in the physical memory on the source host (216) that is allocated for exclusive use by virtual machine (218).

Consider an example in which the virtual machine (218) continues to execute on the source host (216) while the contents of the physical memory on the source host (216) that is allocated for exclusive use by virtual machine (218) is transferred to the destination host (226). In such an example, assume that continuing to execute the virtual machine (218) on the source host (216) causes pages in the physical memory to be 'dirtied' at a rate of 1 page per second. In such an example, a page in memory is 'dirtied' when data is written to the page in memory. Furthermore, assume that transferring the contents of the physical memory on the source host (216) that is allocated for exclusive use by virtual machine (218) to the destination host (226) takes 10 seconds. In such an example, because the virtual machine (218) continues to execute on the source host (216), 10 pages of the physical memory on the source host (216) that is allocated for exclusive use by virtual machine (218) will be dirtied during the transfer of the contents of the physical memory on the source host (216) to the destination host (226). The 10 dirtied pages will also need to be transferred from the source host (216) to the destination host (226) in order for the destination host (226) to have an accurate copy of the virtual machine's memory when the virtual machine (218) ceased to execute on the source host (216). As such, the amount of data to be transmitted from the source host (216) to the destination host (226) when migrating the virtual machine (218) from the source host (216) to the destination host (226) includes not only the contents of the physical memory on the source host (216) that is allocated for exclusive use by virtual machine (218) but also the pages that were dirtied when transferring the contents of the physical memory on the source host (216)

to the destination host (226). This technique of transferring memory pages for migration is referred to as iterative precopy technique. In the example method of FIG. 3, the amount of data to be transmitted from the source host (216) to the destination host (226) may therefore be determined in dependence upon a memory size of the virtual machine (218), the network bandwidth used for migration, the maximum allowed virtual machine downtime (stop-copy duration), and a dirty page rate for the virtual machine (218).

An embodiment may include an example cost of migration model that models the cost of a VM migration as the total traffic generated due to the migration as well as the downtime experienced by a migrating VM, where the amount of traffic depends on the VM's memory size, its page dirty rate, and the available bandwidth. Hypervisors typically use precopy live migration technique, in which memory pages that have been written to ("dirtied") are iteratively copied over (pre-copy phase). When the number of memory pages that have to be migrated are lower than particular value, the hypervisor stops the VM on the source host, transfers the remaining pages, and starts the VM on the destination host. This phase is called the stop-copy phase.

Equations for the number of pre-copy cycles, and for the total traffic generated during a migration can be derived as follows. It is assumed that the following parameters are given constants:

the memory size M of a VM in MB, the page dirty rate R of a VM in MB/s, and the bandwidth of the link used for migration L in MB/s.

In practice, the page dirty rate of a VM and available bandwidth for migration are unlikely to be constants and should be replaced by an average value or the expected value. If $N_i$ denotes the traffic on the ith pre-copy cycle, in the first iteration the traffic will be $$N_1 = M$$

In the second iteration, only the pages that were dirtied during this time will be sent $$N_2 = \frac{M}{L} \times R$$

In the third iteration, only the pages that were dirtied during the first iteration will be sent again $$N_3 = \frac{\left(\frac{M}{L} \times R\right)}{L} \times R$$

Taking the page dirty rate and time taken for a pre-copy cycle into account, it is easy to see that this is a geometric sequence and $$N_i = M \cdot \frac{R^{i-1}}{L^{i-1}}$$

Thus if there are n pre-copy cycles and one final stop-copy cycle, the total traffic generated by the migration is:

$$N = \sum_{i=1}^{n+1} N_i = M \cdot \left(\frac{1 - (R/L)^{n+1}}{1 - R/L}\right)$$

and the total migration time N/L.

Furthermore, the conditions for stopping the pre-copy cycle may be as follows:

The current dirty memory can be transmitted in T milliseconds (where T is a user setting). T is called the switchover goal time. It represents the maximum duration of a stop copy phase and hence it is the maximum downtime an application will face. Assuming pre-copy phase stops after n iterations, then this implies:

$$M \cdot \frac{R^n}{L^n} < T \cdot L => n < \log_{R/L} \frac{T \cdot L}{M}$$

VM migration did not make enough progress in the previous pre-copy cycle. A hypervisor measures the progress of a live migration by the difference in dirty memory before and after a pre-copy cycle. This difference should at least be X MBs, where X is a user setting. X is referred to as the minimum required progress amount. This implies:

$$M \cdot \frac{R^{n-1}}{L^{n-1}} - M \cdot \frac{R^n}{L^n} < X$$

$$M \cdot \frac{R^{n-1}}{L^{n-1}} < \frac{X \cdot L}{L - R}$$

$$M \cdot \frac{R^n}{L^n} < \frac{X \cdot R}{L - R}$$

$$n < \log_{R/L} \frac{X \cdot R}{M \cdot (L - R)}$$

Combining the two conditions, the number of pre-copy cycles n, can be given by:

$$n = \min\left(\log_{R/L} \frac{T \cdot L}{M}, \log_{R/L} \frac{X \cdot R}{M \cdot (L - R)}\right)$$

In the example method of FIG. 3, determining (206), by the virtual machine migration module (202), a migration cost (208) for migrating the virtual machine (218) from the source host (216) to the destination host (226) also includes determining (304) a maximum amount of time available for migrating the virtual machine (218) from the source host (216) to the destination host (226). In the example method of FIG. 3, the maximum amount of time available for migrating the virtual machine (218) from the source host (216) to the destination host (226) is typically determined by the hypervisor conditions for stopping iterative pre-copy or for timing out a particular migration. This may also be related to the amount of time that a particular virtual machine (218) can be unavailable, the maximum amount of time that a migration can utilize a particular network link, and so on. Determining (304) a maximum amount of time available for migrating the virtual machine (218) from the source host (216) to the destination host (226) may therefore be carried out, for example, by receiving such a value as an input parameter from a system administrator. Using a maximum amount for time migrating a VM ensures that minimal bandwidth is utilized for migration and other flows in the shared data center network are least impacted, while ensuring that migration does not time out due to lack of progress caused by low bandwidth. A user can also specify a very low value of migration time, in which case, the system would automatically provision higher bandwidth for migration based on the cost of migration model so that migration finishes quickly.

In the example method of FIG. 3, reserving (214) bandwidth for transferring the virtual machine (218) from the source host (216) to the destination host (226) in dependence upon the migration cost (208) includes setting (306) bandwidth to a value such that the amount of data to be transmitted from the source host (216) to the destination host (226) can be transmitted over the least congested network path within the maximum amount of time available for migrating the virtual machine (218) from the source host (216) to the destination host (226). The virtual machine migration module (202) may further ensure that minimal bandwidth is utilized for migration, background flows in the shared data center network (224) are least impacted, and migration does not time out due to lack of progress caused by low bandwidth. In the example method of FIG. 3, once the amount of data to be transmitted from the source host (216) to the destination host (226) is identified and the maximum amount of time available for migrating the virtual machine (218) has been identified, the bandwidth required to transfer the amount of data within the maximum amount of time can be identified by dividing the amount of data by the maximum amount of time. Consider an example in which the amount of data to be transferred is 5 MB and the maximum amount of time allowed for the transfer is 5 seconds. In such an example, the bandwidth must be set to a rate of at least 1 MB/second in order to transfer the 5 MB of data within the 5 second period.

Consider an example in which a system administrator required that the migration of virtual machine (218) should finish migration within 180 seconds when being transferred from the source host (216) to the destination host (226). In such an example, the virtual machine (218) memory pages will start getting transferred from the source host (216) using iterative pre-copy technique while the virtual machine (218) is still running. When the number of memory pages to be transferred fall below a particular threshold, pre-copy is stopped, and the stop copy phase is started in which the virtual machine (218) would be halted from execution on the source host (216), the virtual machine (218) and its remaining dirty memory pages would be sent to the destination host (226), and the virtual machine (218) would be executed on the destination host (226). Assume that in such an example the migration cost (208) included information indicating that transferring the virtual machine (218) from the source host (216) to the destination host (226) would require that 1800 MB of total migration data be transferred from the source host (216) to the destination host (226). In such an example, the bandwidth for transmitting the virtual machine (218) from the source host (216) to the destination host (226) would need to be set (214) at a rate of 10 MB/second or higher in order to transfer the 1800 MB of data within the 180 second time period so that the migration finishes within the given deadline without affecting other traffic in the network. Similarly, a user may provide a limit on the amount of time the virtual machine (218) may be down during a migration (e.g., 10 seconds). This, in turn, would directly correspond to the length of the stop-copy phase or the switchover goal time (T in the example migration cost model). Using the migration cost model, an appropriate bandwidth may be set such that the virtual machine (218) could only be unavailable for the user specified time.

Figure 4:
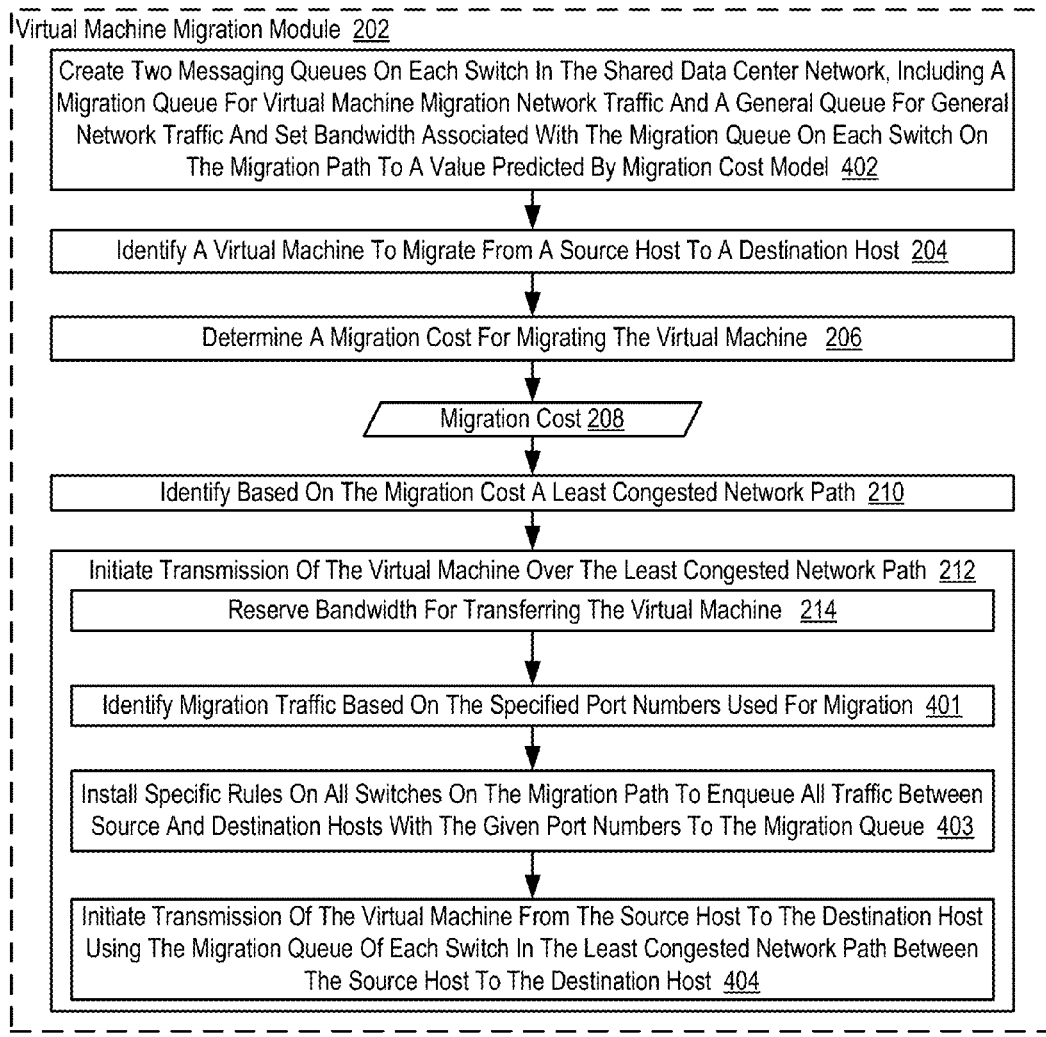
FIG. 4 sets forth a flow chart illustrating an example method for providing automated QoS for virtual machine migration across a shared data center network according to embodiments of the present invention.
Figure 4:
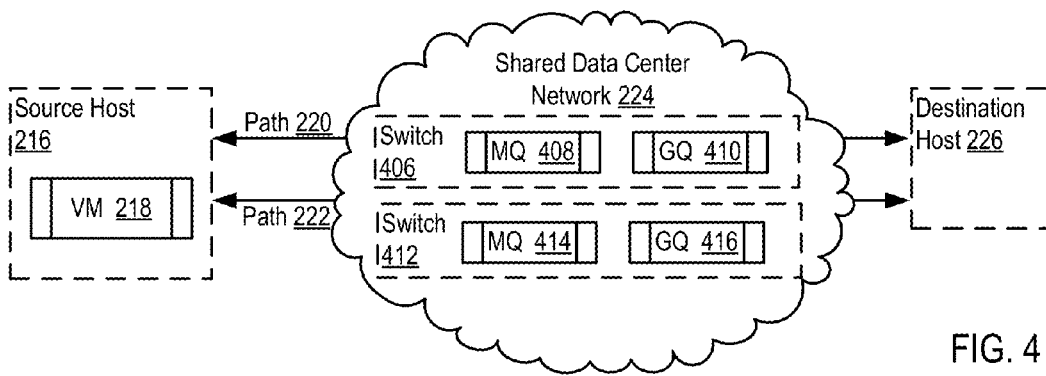

For further explanation, FIG. 4 sets forth a flow chart illustrating a further example method for providing automated QoS for virtual machine (218) migration across a shared data center network (224) according to embodiments of the present invention. The example method of FIG. 4 is similar to the example method of FIG. 2 as it also includes identifying (204) a virtual machine (218) to migrate from a source host (216) to a destination host (226), determining (206) a migration cost (208) for migrating the virtual machine (218) from the source host (216) to the destination host (226), identifying (210) based on the migration cost (208) a least congested network path between the source host (216) and the destination host (226), initiating (212) transmission of the virtual machine (218) from the source host (216) to the destination host (226) over the least congested network path, and reserving (214) bandwidth for transferring the virtual machine (218) from the source host (216) to the destination host (226) in dependence upon the migration cost (208).

The example method of FIG. 4 also includes creating (402), by the virtual machine migration module (202), two messaging queues on each switch (406, 412) in the shared data center network (224), including a migration queue (408, 414) for virtual machine migration network traffic and a general queue (410, 416) for general network traffic setting bandwidth associated with the migration queue (408, 414) on each switch (406, 412) on the migration path to a value predicted by a migration cost model. In the example method of FIG. 4, each switch (406, 412) is a computer networking device for connecting one or more network segments or network devices. The switches (406, 412) of FIG. 4 connect the source host (216) to the destination host (226) for data communications.

In the example method of FIG. 4, each switch (406, 412) includes two messaging queues. Each messaging queue is a data structure used in transferring data communications messages, data communications packets, and the like. In such an example, the sender of a data communications message may insert a message into a messaging queue and the recipient of the data communications message may dequeue the message from the messaging queue. In the example method of FIG. 4, each switch (406, 412) includes a migration queue (408, 414) for virtual machine migration network traffic and a general queue (410, 416) for general network traffic. That is, all network traffic that is generated by migrating a virtual machine (218) from a source host (216) to a destination host (226) (referred to as migration traffic) is placed in a particular migration queue (408, 414) while all other network traffic exchanged between the source host (216) and the destination host (226), or any other pair of hosts, is placed in a particular general queue (410, 416).

In the example method of FIG. 4, initiating (212) transmission of the virtual machine (218) from the source host (216) to the destination host (226) over the least congested network path, includes identifying (401) migration traffic based on the specified port numbers used for migration. In the example method of FIG. 4, initiating (212) transmission of the virtual machine (218) from the source host (216) to the destination host (226) over the least congested network path, also includes installing (403) specific rules on all switches on the migration path to enqueue all traffic between source and destination hosts with the given port numbers to the migration queue. Migration traffic can be automatically identified based on the specified port numbers used for migration and specific rules may be installed on switches to enqueue all traffic between source and destination hosts with the given port numbers to the migration queue. Furthermore, the bandwidth associated with the migration queue on each switch on the migration path can be appropriately set to the value predicted by the cost of migration model. This ensures that the appropriate bandwidth (as predicted by cost of migration model) is provisioned for migration traffic.

In the example method of FIG. 4, initiating (212) transmission of the virtual machine (218) from the source host (216) to the destination host (226) over the least congested network path, includes initiating (404) transmission of the virtual machine (218) from the source host (216) to the destination host (226) using the migration queue (408, 414) of each switch (406, 412) in the least congested network path between the source host (216) to the destination host (226). In the example method of FIG. 4, the least congested network path between the source host (216) to the destination host (226) may include one or more switches (406, 412). Because each switch (406, 412) includes a migration queue (408, 412), all virtual machine (218) migration traffic may be routed through the migration queue (408, 414) of each switch (406, 412) that is part of the least congested network path between the source host (216) to the destination host (226).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for providing automated quality-of-service ('QoS') for virtual machine migration across a shared data center network, the apparatus comprising a computer processor and a computer memory operatively coupled to the computer processor, the computer memory having disposed within it computer program instructions that, when executed by the computer processor, cause the apparatus to carry out the steps of:
  identifying, by a virtual machine migration module, a virtual machine to migrate from a source host to a destination host;
  determining, by the virtual machine migration module, a migration cost for migrating the virtual machine from the source host to the destination host including:
    determining an amount of data to be transmitted from the source host to the destination host when migrating the virtual machine from the source host to the destination host; and
    determining a maximum amount of time available for migrating the virtual machine from the source host to the destination host;
  identifying based on the migration cost, by the virtual machine migration module, a least congested network path between the source host and the destination host and a bandwidth to be used for migration; and
  receiving a user specified time limit for completing the migration over the identified least congested network path;
  initiating, by the virtual machine migration module, transmission of the virtual machine from the source host to the destination host over the least congested network path, including reserving bandwidth across the shared data center network for transferring the virtual machine from the source host to the destination host in dependence upon the migration costs,
    wherein reserving bandwidth includes setting a transmission rate to a value, and
    wherein the amount of data to be transmitted from the source host to the destination host is to be transmitted over the least congested network path at the transmission rate within the maximum amount of time available for migrating the virtual machine from the source host to the destination host.

2. The apparatus of claim 1 wherein the amount of data to be transmitted from the source host to the destination host is determined in dependence upon a memory size of the virtual machine, network bandwidth to be used for migration, a maximum allowed downtime for the virtual machine, and a dirty page rate for the virtual machine.

3. The apparatus of claim 1 further comprising computer program instructions that, when executed by the computer processor, cause the apparatus to carry out the step of
  identifying switches in the shared data center network and in the least congested network path;
  creating, by the virtual machine migration module, two messaging queues on each of the switches in the shared data center network, including a migration queue for virtual machine migration network traffic and a general queue for general network traffic and setting bandwidth associated with the migration queue on each of the switches on the least congested network path to a value predicted by a migration cost model.

4. The apparatus of claim 3 wherein initiating transmission of the virtual machine from the source host to the destination host over the least congested network path, includes
  specifying port numbers used for migration;
  identifying migration traffic based on the specified port numbers used for migration;
  installing specific rules on all switches on the least congested network path to enqueue all traffic between source and destination hosts with the port numbers to the migration queue; and
  initiating transmission of the virtual machine from the source host to the destination host using the migration queue of each of the switches in the least congested network path between the source host to the destination host.

5. A computer program product for providing automated quality-of-service ('QoS') for virtual machine migration across a shared data center network, the computer program product disposed upon a non-transitory computer readable medium, the computer program product comprising computer program instructions that, when executed, cause a computer to carry out the steps of:
  identifying, by a virtual machine migration module, a virtual machine to migrate from a source host to a destination host;
  determining, by the virtual machine migration module, a migration cost for migrating the virtual machine from the source host to the destination host including:
    determining an amount of data to be transmitted from the source host to the destination host when migrating the virtual machine from the source host to the destination host; and
    determining a maximum amount of time available for migrating the virtual machine from the source host to the destination host;
  identifying based on the migration cost, by the virtual machine migration module, a least congested network path between the source host and the destination host and a bandwidth to be used for migration; and
  receiving a user specified time limit for completing the migration over the identified least congested network path;
  initiating, by the virtual machine migration module, transmission of the virtual machine from the source host to the destination host over the least congested network path, including reserving bandwidth across the shared data center network for transferring the virtual machine from the source host to the destination host in dependence upon the migration costs,
    wherein reserving bandwidth includes setting a transmission rate to a value, and
    wherein the amount of data to be transmitted from the source host to the destination host is to be transmitted over the least congested network path at the transmission rate within the maximum amount of time available for migrating the virtual machine from the source host to the destination host.

6. The computer program product of claim 5 wherein the amount of data to be transmitted from the source host to the destination host is determined in dependence upon a memory size of the virtual machine, network bandwidth to be used for migration, a maximum allowed downtime for the virtual machine, and a dirty page rate for the virtual machine.

7. The computer program product of claim 5 further comprising computer program instructions that, when executed, cause the computer to carry out the step of
   identifying switches in the shared data center network and in the least congested network path:
      creating, by the virtual machine migration module, two messaging queues on each of the switches in the shared data center network, including a migration queue for virtual machine migration network traffic and a general queue for general network traffic and setting bandwidth associated with the migration queue on each of the switches on the least congested network path to a value predicted by a migration cost model.

8. The computer program product of claim 7 wherein initiating transmission of the virtual machine from the source host to the destination host over the least congested network path, includes:
   specifying port numbers used for migration;
   identifying migration traffic based on the specified port numbers used for migration;
   installing specific rules on all switches on the least congested network path to enqueue all traffic between source and destination hosts with the port numbers to the migration queue; and
   initiating transmission of the virtual machine from the source host to the destination host using the migration queue of each of the switches in the least congested network path between the source host to the destination host.

\* \* \* \* \*